United States Patent [19]

Young

[11] 4,111,440
[45] Sep. 5, 1978

[54] SEALING MEMBERS

[75] Inventor: James Young, London, England

[73] Assignee: J. Young (Scientific Glassware) Ltd., England

[21] Appl. No.: 814,154

[22] Filed: Jul. 11, 1977

[30] Foreign Application Priority Data

Jul. 23, 1976 [GB] United Kingdom ............... 30903/76

[51] Int. Cl.² ............................................. F16J 9/06
[52] U.S. Cl. .................................. 277/165; 251/214; 277/1
[58] Field of Search ..................... 277/1, 165; 251/214

[56] References Cited

U.S. PATENT DOCUMENTS

| 3,303,757 | 2/1967 | Ward | 277/165 |
| 3,663,024 | 5/1972 | Traub | 277/165 |
| 3,910,553 | 10/1975 | Boylan | 251/214 |
| 3,983,896 | 10/1976 | Harrington | 251/214 |

FOREIGN PATENT DOCUMENTS

| 1,157,620 | 7/1969 | United Kingdom. |
| 1,253,205 | 11/1971 | United Kingdom. |
| 1,463,303 | 2/1977 | United Kingdom. |
| 1,473,500 | 5/1977 | United Kingdom. |

*Primary Examiner*—Robert I. Smith
*Attorney, Agent, or Firm*—Biebel, French & Nauman

[57] ABSTRACT

A method of making a sealing member and a sealing member made by the method, for association with a bore in a barrel member comprises cutting into and rolling a thin layer from a rod of circular cross-section, preferably made of P.T.F.E., leaving the rolled layer integral with the support, forming an annular groove in the support for an elastomeric sealing ring, unrolling the rolled layer so as to form a sheath which covers the ring and so as to leave a rolled portion of the sheath on one side of the ring which forms a resilient annular bulge in the sheath, and compressing the rolled portion whereby the sealing ring is sealed on both its sides by the sheath.

15 Claims, 13 Drawing Figures

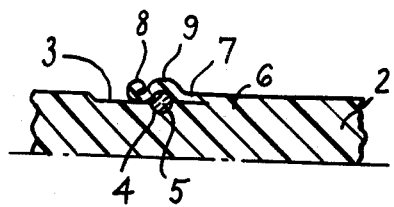
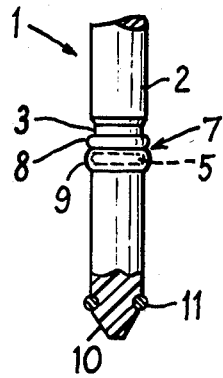
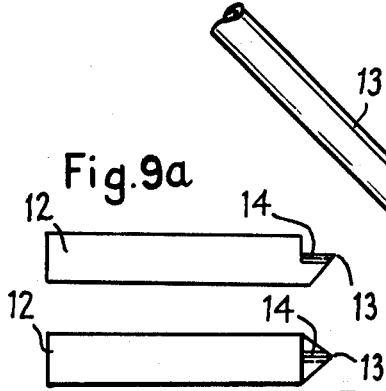
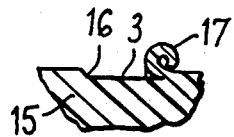 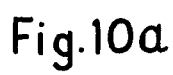
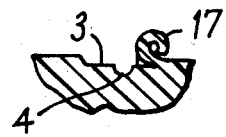 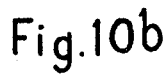
 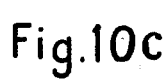

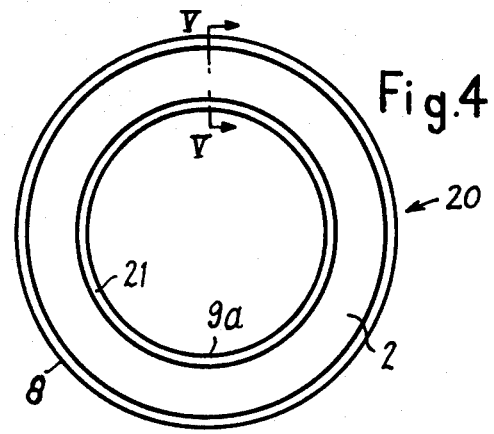
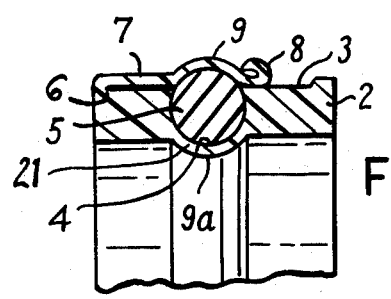
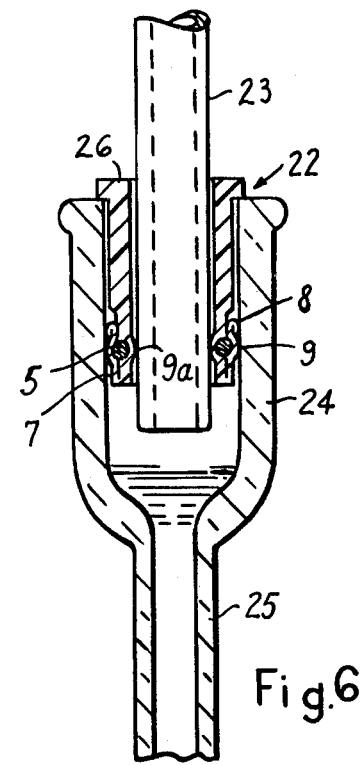
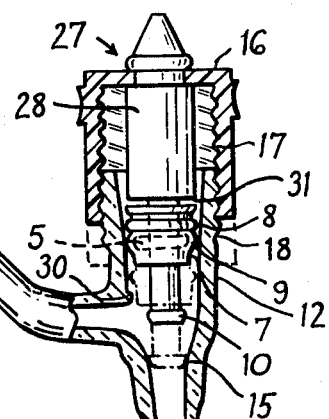
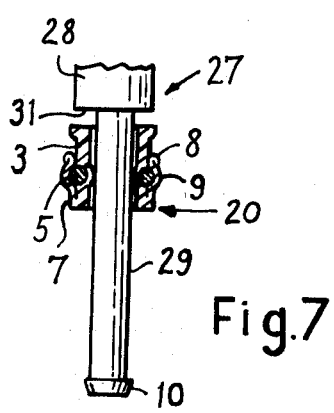

SEALING MEMBERS

This invention relates to sealing members comprising at least one sealing ring, the sealing members being intended for use with barrel members and being applicable to the inner walls of the barrel members to effect a seal. The invention is also concerned with such sealing members in the form of valve members for controlling the flow of chemical fluids through barrel members and to flow control devices incorporating the same.

Sealing members comprising sealing rings made of chemically inert tough compressible materials such as polytetrafluoroethylene (P.T.F.E.) or of elastomeric materials such as VITON are known.

Although P.T.F.E. sealing rings have the desired chemical inertness and negligible co-efficient of friction which enables their use in expensive apparatus using high vacuum or performance sealing valve members in barrel members having precise bores, for example as described in the Applicant's British Patent Specification No. 1,253,205, their lack of resilience renders them unsuitable for use in certain other applications e.g. with barrel members having imprecise bores such as for general purpose use in the laboratory. On the other hand, elastomeric sealing rings may have the desired resilience but their use has, hitherto, been curtailed due to their lack of resistance to attack by some chemicals and their tendancy to stick to the barrel member walls.

Attempts have been made to sheath elastomeric sealing rings in chemically inert, tough, compressible materials with a view to combining the advantages of such materials with those of the elastomers but these attempts have not in the Applicant's experience been entirely satisfactory. For example, in British Patent Specification No. 1,157,620 there is described a composite sealing member in the form of a valve spindle or piston in which a separate annular sheath made for example from P.T.F.E. and fitted on a core is expanded into sealing contact with the inner wall of a surrounding glass vessel by compressing an elastomeric sealing ring in the form of a rubber tube by means of a nut and spring or by a fluid pressurised by a rod screwed into the core. However, compression of the rubber tube in this way can cause breakage of the surrounding glass since the degree of compression is not easy to adjust. Moreover, the resilient effect of the rubber tube is diminished due to the thickness of the surrounding sheath which must be sufficient to maintain the form of the separate sheath. With such sealing members, high vacuums cannot be guaranteed, over compression of the rubber tube can result in splitting of the sheath and any relaxation of the compression force can result in a chemical bypassing the expanded area of the sheath and attacking the rubber tube. Further, the valve spindle or piston is of complex construction and is made of several parts.

British Patent Specification No. 1,473,500 also discloses a multi-part sealing member in the form of a valve member comprising a mandrel and a separate sheath, e.g. of P.T.F.E., which is fitted over one end of the mandrel to surround a resilient rubber sealing ring in an annular groove in the mandrel. Although, the specification teaches that the rubber ring compresses the wall of the sheath outwards with a view to providing a resilient seal between the inner wall of a barrel and the spindle, practically this outward compression is very slight due to the thickness of the sheath. Also, since there is no positive attachment of the sheath to the mandrel and due to the thickness of the sheath wall necessary for maintenance of the sheath form, the Applicants have found that such a valve member is not suitable for high vacuum use, e.g. up to $10^{-6}$ torr, since chemicals can escape between the sheath and the barrel member and can pass down between the sheath and the mandrel to attack the rubber sealing ring. Furthermore, due to the rotating action of the valve mandrel with respect to the barrel member, the sheath tends to move with respect to the mandrel loosening the friction fit therebetween unless some connecting means, for example a splined metal connecting member providing an additional part to the valve member, is interposed between the end of the sheath and the mandrel. Also, this valve member suffers poor cut-off, entrapment of liquid between the valve member and its bore by capilliary attraction, too much dead space and flow hold-up. Because of this, for general purpose use, recourse is often had in the laboratory to greased ground-glass valve members with all their disadvantages.

Accordingly, it is an object of this invention to provide a composite sealing member having an elastomeric sealing ring which is sheathed with a substantially chemically inert, tough, compressible material and in which the aforesaid disadvantages are minimized or avoided.

From one aspect, the invention consists in a sealing member for association with a bore in a barrel member, comprising a support of circular cross-section made of a substantially chemically inert, tough, compressible material, a sealing ring made of an elastomeric or like material mounted in an annular groove in the support and a sheath which covers the ring and is sufficiently thin for the sealing ring to form a resilient annular bulge in the sheath, said sheath being integral with the support on one side of the sealing ring and on the other side of the sealing ring having a compressed rolled portion, whereby the sealing ring is sealed on both its sides by the sheath.

Since the elastomeric sealing ring is hermetically sealed on its two sides by the integral connection, and rolled portion, of the sheath and since the sheath has an annular compressible resilient bulge therein due to the thinness of the sheath, the advantages of the elastomeric and chemically inert, tough, compressible materials are combined to produce a sealing member in which the sealing ring elastomers are not attached by solvents, which can be used with corrosive and toxic fluids, inert gases, high purity liquids like ether, pyridine and any other insidious liquid material. Further by virtue of the resilient bulge in the sheath the sealing member of the invention can be used to seal imprecise bores, e.g. in the bores of production glass tubing, glass to metal and metal to metal tubing.

The support may be solid when for use as a valve plug or piston to control fluid in a flow control device or of hollow form, i.e. of annular cross-section, when for use for example in a joint for joining tubing or in a pump.

In an embodiment of hollow sealing member according to the invention, the portion of the support underlying the annular groove accommodating the elastomeric sealing ring is sufficiently thin for the ring to form also a resilient bulge in this support portion. Thus, when the sealing member is incorporated in a joint for joining a glass tube to a barrel member of greater external diameter the two annular resilient bulges engage with the outer wall of the tube and inner wall of the barrel member respectively.

In another embodiment of the invention, which is in the form of a valve member and is particularly suitable for general purpose use in the laboratory, the hollow sealing member is mounted on a spindle portion of the valve member such that the hollow sealing member and spindle portion are axially slidable with respect to each other.

To obtain a double sealing action for both atmospheric and fluid seals, the rolled portion of the sheath may serve as a sealing ring in addition to the resilient bulge.

The elastomeric sealing ring may be an O-ring or a square section ring.

Preferably, the support with its integral cylindrical sheath is made of P.T.F.E. and the elastomeric sealing ring is made of VITON but a wide range of suitable elastomeric materials can be used, such as rubber, silicon elastomers and neoprene.

The barrel member is preferably made of a glass, e.g. soda glass, boro-silicate glass or quartz glass, which has a negligible co-efficient of expansion, but the sealing member of the invention may be used as a compression joint to join glasses having different co-efficients of expansion.

The valve member is preferably for use with a barrel member having an external screw-thread at its inlet which is engagable with a corresponding screw-thread on a cap member rotatably mounted on the valve member so that when the valve member is inserted in the bore of the barrel member the resilient bulge engages with the barrel to seal the barrel inlet and the free end of the valve plug or piston can engage with a tapered seating in the barrel outlet to shut-off fluid flow therethrough.

The cap member is conveniently made of plastics material such as nylon or polypropylene.

From another aspect the invention consists in a flow control device incorporating any of the valve members defined above or a joint incorporating a hollow sealing member as defined above.

The hollow sealing member may be used in a compression joint, in the sliding sleeve of a gas pump, in glass to metal seals and as a graded seal.

From a further aspect, the invention consists in a method of making a sealing member for association with a bore in a barrel member, which method comprises cutting into and rolling a thin layer from a rod of circular cross-section made of a substantially chemically inert, tough, compressible material, leaving the rolled layer integral with the rod, forming an annular groove in that portion of the rod from which the thin layer was rolled, fitting a sealing ring made of an elastomeric or like material in said annular groove, unrolling the rolled layer so as to cover the sealing ring and leave a rolled portion of the layer on one side of the ring, and compressing the rolled portion thereby to sealingly enclose the ring.

By means of the method of the invention the sheath can be made of the desired thinness consistent with the elastomeric sealing ring forming the resilient bulge in the sheath. The sheath thickness is conveniently of the order of 0.006 inch but may vary to either side of this value provided that the sheath is not either too thin such that it will split or too thick such as to prevent formation of the resilient bulge in the sheath.

The cutting and rolling actions are conveniently carried out by means of a tool having a rounded portion terminating in a cutting tip or point, which is moved parallel to the rod whilst the rod is rotating, with the rounded portion facing in the direction of movement.

The invention will now be further described, by way of example, with reference to the accompanying drawings, in which the same references are used to designate the same or similar parts and in which:

FIG. 1 is a part-sectional side elevation of one embodiment of sealing member according to the invention, with part broken away, FIG. 2 is a longitudinal section through a part of the valve member of FIG. 1, to an enlarged scale, FIG. 3 is a part-sectional side elevation of a flowcontrol device incorporating the valve member of FIG. 1, FIG. 4 is a side elevation of another embodiment of sealing member, FIG. 5 is a cross-section taken along the line V—V of FIG. 4, FIG. 6 is a part-sectional side elevation of a joint incorporating the sealing member of FIG. 4, FIG. 7 is a part-sectional side elevation of a valve member incorporating the sealing member of FIG. 4, with part broken away, FIG. 8 is a part-sectional side elevation of a flowcontrol device incorporating the valve member of FIG. 7, FIGS. 9a and 9b are a plan view and a side elevation view respectively of a tool used in one method of making the sealing members shown in FIGS. 1 and 4, and FIGS. 10a to 10c show steps in the method of making the sealing member of FIG. 1 using the tool of FIG. 9.

The sealing member shown in FIGS. 1 and 2 is in the form of a valve member generally indicated at 1 and comprising a solid support 2 of circular cross-section and constituted by a valve plug or piston made of P.T.F.E. Intermediate its ends, the support 2 has a portion 3 of reduced diameter in which is located an annular groove 4. A sealing ring 5 made of an elastomeric material such as VITON (Trade Mark) is fitted in the annular groove 4 which is of a depth which enables the outer periphery of the ring to project beyond the cylindrical surface of the reduced portion 3 of the support. Integral with the support 2 on one side of the ring 5, as indicated at 6, is a cylindrical sheath 7 which covers the ring 5 and terminates in a compressed rolled portion 8 on the other side of the ring. It should be understood that in this specification the term "rolled portion" includes within its ambit a partial roll or one or more complete rolls of sheath material. The rolled portion 8 is compressed against the support 2 on the other side of the ring 5 so that the ring is sealed on this side and on its side where the sheath is integral with the support at 6 to prevent the elastomeric ring from being attacked by chemicals when the valve member 1 is incorporated for example in the flow control device of FIG. 3. The integral P.T.F.E. sheath 7 is sufficiently thin, for example 0.006 inch, to enable the ring 5 to form in the sheath a resilient bulge 9 and thereby provide a composite sealing ring which combines the resilience of the elastomeric sealing ring with the previously mentioned properties of P.T.F.E.. The thickness of the sheath as illustrated is relatively much thicker than it would be in practice for clarity of illustration. When the sealing ring 5 is made of VITON which is a black material the ring can easily be seen through the sheath. The support 2 has a tapering free end portion 10 of frusto-conical form adjacent which, in the cylindrical surface of the support, is formed an annular groove in which is located a sealing ring 11 also made of P.T.F.E..

One method of making the sealing valve member 1 of FIG. 1 will now be described with reference to FIGS. 9 and 10. The tool shown in FIG. 9a is of metal and has a square section shank 12 for supporting the tool in a tool support of a lathe which is not shown since it is well known and forms no part of this invention. At one end of the shank the tool has working portion of generally triangular configuration comprising a cutting tip 13 and a rounded portion 14 inset from the surface of the shank for a purpose to be described. A circular cross-section rod 15 of P.T.F.E. which will ultimately form the support 2 is clamped in the lathe chuck and the tool is clamped in the lathe tool support in the position shown in FIG. 9b with the rounded portion facing to the right-hand as illustrated in FIG. 10a. The lathe chuck is rotated causing the rod 15 to rotate and the cutting tip 13 is moved into contact with the rod 15 at 16 and to a depth consistent with forming a very thin sheath. The tool is then translated along the lathe bed in parallel with the rod to cut away a thin cylindrical layer 17 from the cylindrical outer surface of the rod, the rounded portion 14 of the tool causing the layer 17 to roll into the position shown in FIG. 10a leaving the rolled layer integral with the rod 15. By leaving the layer 17 integral with the rod a very thin sheath can be formed which can be rolled away from the rod and which is not possible with separately formed sheaths which have to be of a thickness to maintain their form. Whilst the rod is rotating another suitable cutting tool of well known type is brought into contact with the reduced diameter portion 3 uncovered by the rolled layer 17 to form the annular groove 4, as shown in FIG. 10b. Rotation of the rod is stopped whilst the elastomeric sealing ring 5 is fitted in the groove 4 as will be apparent from FIG. 10c. The rod is then rotated again and a suitable blunt instrument e.g. a wooden peg, is used to unroll the rolled layer 17 over the ring 5 to cover it and form the sheath 7 with the rolled portion 8 and the resilient bulge 9 intermediate the ends of the sheath on one side of the ring as shown in FIG. 2. The rolled portion is then compressed, preferably by inserting it in a tapered glass barrel, to cause the material thereof to flow and thereby sealingly enclose the ring. The elastomeric sealing ring 5 is hermetically enclosed thereby preventing the ring elastomers from being attacked by solvents.

Referring now to FIG. 3, the valve member 1 is inserted in a glass barrel 12 having a tapered inlet, for the purpose of controlling the flow of chemicals through the barrel through integral inlet and outlet tubes 13 and 14. For translating the valve member 1 in the cylindrical bore of the barrel between the illustrated full line position in which the fluid can flow from the inlet tube 13 through the barrel outlet and into the outlet tube 14 and a chain line position in which the P.T.F.E. sealing ring 11 engages with an annular seating 15 in the barrel outlet to prevent the flow of fluid therethrough, the support 2 has a cap 16 rotatably mounted thereon near its other end. The cap 16 has internal screw-threads 17 which engage with external-threads 18 on the barrel and since the cap can rotate with respect to the support 2, the valve member is translated without rotating thereby reducing wear. The threads are preferably multi-start for fine adjustment and quick cut-off and can be single start if desired. The tapered form of the barrel inlet facilitates insertion of the valve member 1 into the bore of the barrel, which bore is of lesser diameter than the external diameter of the resilient bulge 9 and rolled portion 8 of the sheath. It will be seen from FIG. 3 that the resilient bulge 9 presses against the internal wall of the barrel to seal the barrel inlet and appears to wet the glass barrel when viewed from the outside. Also, the rolled portion 8 of the sheath may be compressed by the internal wall of the barrel thereby serving as an additional sealing ring. Thus, there is provided a double sealing action for both atmospheric and fluid seals.

Optionally, the support 2 may be provided with an integral sealing ring (not shown) flush with a shoulder 19 to engage with the bore 11 providing a tripple sealing action with atmospheric and fluid seals or alternatively a further annular groove may be provided in the reduced portion 3 in which a sealing ring of P.T.F.E. may be fitted.

In a modification, the support may be of the form described in the Applicant's British Patent Specification No. 1463303, the subject matter of which is incorporated into this specification by reference, to enable the valve member to be used in burettes, fluid separators and gas samplers for example.

In the embodiment of FIGS. 4 and 5, the sealing member 20 is hollow, i.e. a gland seal the support of which is of annular form, and is conveniently made by the same method as that of FIGS. 1 and 2 from a hollow rod. However, the thickness of the circular wall of the support is such that when the annular groove 4 is formed therein a very thin support portion 21, e.g. of 0.006 inch, is left at the bottom of the groove. Thus, when the elastomeric ring 5 is accommodated in the groove, it also forms a resilient bulge 9a in the support portion 21, which projects beyond the inner periphery of the support. This hollow seal has a wide variety of applications and uses. It can be used for joints in pipe lines, a glass to metal, metal to metal seal etc. and in pumps since the compression inside and outside, i.e. of the resilient bulges 9, 9a, gives a very tight smooth bearing. One such use is shown in FIG. 6 in which the gland seal 20 is incorporated in a joint 22, the support 2 in this instance being in the form of a sleeve. The joint 22 joins a glass tube 23 to a glass barrel 24 having an integral tube 25 of lesser diameter than the barrel. The resilient bulges 9, 9a engage resiliently with the outer and inner walls of the barrel 24 and tube 23, providing a very tight, smooth, bearing and a fluid-tight seal. It will be seen from FIG. 6 that the rolled portion 8 of the sheath also engages with the inner wall of the barrel 24. To prevent the support sleeve 2 from disappearing into the barrel when the joint is assembled, the sleeve has an annular shoulder 26 which abuts the annular edge of the barrel inlet.

Another use of the hollow seal of FIGS. 4 and 5 is shown in FIG. 7 in which the seal is incorporated in a sealing valve member 27 which is primarily for general purpose use, e.g. in the general purpose stop-cock shown in FIG. 8. The valve member 27 has a body portion 28 and a spindle portion 29 of reduced diameter on which is slidably mounted the seal 20. The resilient bulge 9a sealingly engages with the spindle portion 29 and is retained on the body portion by the tapered free end 10 but, nevertheless, it permits the seal 20 to be expanded thereover and onto the spindle portion. The valve member is inserted into the cylindrical bore of the barrel 12 through the tapered barrel inlet and the cap 16 screwed on to the barrel. It will be seen from FIG. 8 that the resilient bulge 9 engages the inner wall of the barrel to effect an atmospheric and fluid seal. The rolled sheath portion 8 also may sealingly engage the barrel wall. Optionally, an integral sealing ring projecting from the body portion 28 adjacent the shoulder 31 or an additional sealing ring of P.T.F.E. may be provided instead to effect a triple sealing action. By rotating the cap 16, the valve member 27 is translated in the cylindrical bore of the barrel 12 between the full line position in which fluid flows from the tube 13, through the barrel outlet and into the tube 14 to a chain line position in which the tapered end 10 engages the seating 15 in the barrel outlet to shut-off fluid flow therethrough and in which the resilient bulge 9 abuts a shoulder 30 just above the inlet tube 13 so that the bulge 9 remains resiliently compressed against the inner wall of the barrel.

When the valve member 27 is inserted into the barrel the annular shoulder acts as a stop for the seal 20. When the cap 16 is rotated in a direction to close the barrel outlet after the seal 20 has engaged the shoulder 30, the spindle portion moves relative to the seal until its free end 10 engages the seating 15 to close the barrel outlet. When the cap is rotated in a direction to open the outlet the spindle portion moves relative to the seal due to the lower coefficient of friction obtaining between P.T.F.E. surfaces of the seal and the spindle portion than that between the seal and glass barrel. Flow is almost immediate since there is virtually no dead space by reason of the position of the seal 20 which also ensures, together with the reduced diameter spindle portion 29 that there is virtual elimination of entrapment of liquid between the valve member and the barrel by capilliary attraction. Moreover, there is immediate cut-off when the free end of the valve member engages its seating in the barrel outlet. As with the embodiment of FIG. 3, the rotatable cap ensures that the valve member 27 is translated in the barrel without it being rotated which reduces wear. Fitting of the seals 20 is simplified as compared with the fitting of P.T.F.E. O-rings even for the inexperienced and these valve members are more economical to produce than the high vacuum valve members mentioned previously.

Tests have been carried out on the sealing members of FIG. 1 using a mass spectrometer by connecting the tube 14 of the flow control device of FIG. 3 to a vacuum, and the tube 13 to the mass spectrometer, and then spraying helium around the barrel inlet. The mass spectrometer showed that the resilient bulge 9 maintained an effective seal up to vacuums of $10^{-8}$ torr. Similar tests were also carried out on the hollow sealing member of FIG. 4 when in the compression joint shown in FIG. 6. In this case the mass spectrometer showed that the resilient bulges 9 and 9a were effective up to vacuums of $10^{-10}$ torr.

Various modifications may be made without departing from the scope of the invention as defined in the appended claims. For example, in FIG. 1, the P.T.F.E. sealing ring 11 and its annular groove may be omitted and the tapered free end 10 engage the seating 15 in the barrel outlet and the tapered free end 10 of the valve member 27 in FIG. 7 may be provided with a P.T.F.E. ring in a groove for engaging the seating 15.

What is claimed is:

1. A sealing member for association with a bore in a barrel member, said sealing member comprising:
   (a) a support of circular cross-section made of a substantially chemically inert, tough, compressible material, and support defining an annular groove therein,
   (b) a sealing ring made of an elastomeric material mounted in said annular groove in said support,
   (c) a sheath which covers the ring and is sufficiently thin for the sealing ring to form a resilient annular bulge in the sheath,
   (d) said sheath being integral with the support on one side of the sealing ring, and
   (e) said sheath having a compressed rolled portion on the other side of the sealing ring, whereby the sealing ring is sealed on both its sides by the sheath.

2. A sealing member as claimed in claim 1, wherein the rolled portion of the sheath also serves as a sealing ring.

3. A sealing member as claimed in claim 1, wherein the support with the integral sheath is made of P.T.F.E.

4. A sealing member as claimed in claim 1, and in the form of a valve member of which the support is solid.

5. A flow control device comprising a sealing member as claimed in claim 4, and a barrel member in which the sealing member is mounted with the resilient bulge in engagement with the inner wall of the barrel member to seal an inlet of the barrel member, there being a cap member rotatably mounted on the support and in threaded engagement with the barrel member for translating the sealing member in the barrel member between positions in which the sealing member engages with a seating in an outlet of the barrel member to shut-off fluid flow therethrough an in which the sealing member is disengaged from the seating to permit fluid flow through the outlet of the barrel member.

6. A sealing member as claimed in claim 1, and in the form of a valve member of which the support has fluid flow passages therein.

7. A flow control device comprising a sealing member as claimed in claim 6, and a barrel member in which the sealing member is mounted with the resilient bulge in engagement with the inner wall of the barrel member to seal an inlet of the barrel member, there being a cap member rotatably mounted on the support and in threaded engagement with the barrel member for translating the sealing member in the barrel member between positions in which the sealing member engages with a seating in an outlet of the barrel member to shut-off fluid flow therethrough and in which the sealing member is disengaged from the seating to permit fluid flow through the outlet of the barrel member.

8. A sealing member as claimed in claim 1, wherein the support is of annular cross-section and the portion of the support underlying the annular groove accommodating the elastomeric sealing ring sufficiently thin for the ring to form also a resilient bulge in the support portion.

9. A sealing member as claimed in claim 9, wherein the support with the integral sheath is made of P.T.F.E.

10. A valve member having a spindle portion and comprising a sealing member as claimed in claim 8 mounted on the spindle portion such that the sealing member and spindle portion are axially slidable relative to each other, said spindle portion being made of a substantially chemically inert, tough, compressible material.

11. A valve member as claimed in claim 10, wherein the spindle portion and support are made of P.T.F.E.

12. An assembly comprising two tubular members having inner and outer walls and of different external diameters and a sealing member as claimed in claim 8 mounted on the tubular member of lesser diameter with the resilient bulge in the support portion in engagement with its outer wall and with the resilient bulge in the sheath in engagement with the inner wall of the tubular member of greater diameter.

13. An assembly as claimed in claim 12, wherein the sealing member constitutes a compression joint.

14. An assembly as claimed in claim 12, wherein the sealing member constitutes a sliding seal.

15. A flow control device comprising a valve member as claimed in claim 10 and a barrel member in which the valve member is mounted with the resilient bulge in the sheath engaging with the inner wall of the barrel member to seal an inlet of the barrel member, there being a cap member rotatably mounted on the valve member and in threaded engagement with the barrel member for translating the valve member between positions in which the valve member engages with a seating in an outlet in the barrel member to shut-off fluid flow therethrough and in which the valve member is disengaged from the seating to permit fluid flow through the outlet of the barrel member, the barrel member having a shoulder projecting from its inner wall against which the resilient bulge in the sheath abuts during translation of the valve member towards the seating.

* * * * *

UNITED STATES PATENT AND TRADEMARK OFFICE
CERTIFICATE OF CORRECTION

PATENT NO. : 4,111,440
DATED : September 5, 1978
INVENTOR(S) : James Young

It is certified that error appears in the above-identified patent and that said Letters Patent are hereby corrected as shown below:

Column 5, line 62, after "external" insert --screw--.

Claim 9, line 1, "9" should be --8--.

Signed and Sealed this

Tenth Day of April 1979

[SEAL]

Attest:

RUTH C. MASON
Attesting Officer

DONALD W. BANNER
Commissioner of Patents and Trademarks